(12) United States Patent
Ranta et al.

(10) Patent No.: US 7,372,692 B2
(45) Date of Patent: May 13, 2008

(54) ELECTRICAL ENCLOSURE AND INTERIOR ASSEMBLY THEREFOR

(75) Inventors: Michael J. Ranta, Morton, IL (US); James L. Gehlbach, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 45 days.

(21) Appl. No.: 11/539,713

(22) Filed: Oct. 9, 2006

(65) Prior Publication Data

US 2008/0084655 A1    Apr. 10, 2008

(51) Int. Cl.
*H02B 1/26* (2006.01)
(52) U.S. Cl. ............... 361/641; 361/624; 361/634; 361/644; 361/648; 361/652; 361/673
(58) Field of Classification Search ............... 361/624, 361/627–628, 631, 364, 636–641, 644–650, 361/652, 655–656, 658, 673
See application file for complete search history.

(56) References Cited

U.S. PATENT DOCUMENTS

| | | | | | |
|---|---|---|---|---|---|
| 3,164,752 | A | * | 1/1965 | Koenig | ............... 361/648 |
| 4,142,225 | A | * | 2/1979 | Diersing et al. | ............... 361/647 |
| 4,713,828 | A | * | 12/1987 | Mehrgardt | ............... 375/249 |
| 4,783,718 | A | * | 11/1988 | Raabe et al. | ............... 361/652 |
| 5,046,173 | A | * | 9/1991 | Wall, Jr. | ............... 361/634 |
| 5,272,591 | A | | 12/1993 | Blue et al. | |
| 5,272,592 | A | * | 12/1993 | Harris et al. | ............... 361/637 |
| 5,351,165 | A | * | 9/1994 | Hancock | ............... 361/637 |
| 5,600,536 | A | | 2/1997 | Newsome et al. | |
| 5,640,294 | A | * | 6/1997 | Caggiano et al. | ............ 361/637 |
| 5,640,295 | A | * | 6/1997 | Harris et al. | ............... 361/644 |
| 5,721,667 | A | * | 2/1998 | Rose | ............... 361/627 |
| 5,973,914 | A | * | 10/1999 | Rose et al. | ............... 361/627 |
| 6,459,570 | B1 | * | 10/2002 | Buchanan | ............... 361/648 |
| 6,806,799 | B2 | | 10/2004 | Runyan | |
| 7,298,606 | B2 | * | 11/2007 | M'Sadoques et al. | ........ 361/644 |

OTHER PUBLICATIONS

Siemens Energy & Automation, Inc., "Residential Load Centers and Circuit Breakers", 2003, 11 pp.
General Electric Company, "PowerMark Gold™ Load Centers", 1998, 2 pp.
Schneider Electric, "QO® and Homeline® 4-8 Circuit Space Load Centers", 1999, 2 pp.

* cited by examiner

*Primary Examiner*—Gregory D Thompson
(74) *Attorney, Agent, or Firm*—Martin J. Moran (57) ABSTRACT

An interior assembly for a load center includes a base member disposed at or about a panel member of the load center housing, a first bus bar assembly disposed on the base member, and a first insulating member overlaying the first bus bar assembly and being coupled to the base member. A first portion of the first insulating member receives circuit breakers of the load center, and a second portion receives a second bus bar assembly. A second insulating member overlays the second bus bar assembly and is coupled to the second portion of the first insulating member. A neutral bus bar is coupled to the second insulating member. A fastening mechanism fastens the interior assembly to the panel member. The base member, first and second bus bar assemblies, first and second insulating members, and neutral bus bar are secured together without the use of separate fasteners.

26 Claims, 5 Drawing Sheets

ELECTRICAL ENCLOSURE AND INTERIOR ASSEMBLY THEREFOR

BACKGROUND OF THE INVENTION

1. Field of the Invention

The invention relates generally to electrical enclosures and, more particularly, to interior assemblies for electrical enclosures, such as load centers. The invention also relates to electrical enclosures.

2. Background Information

Electrical equipment such as, for example, relays, circuit breakers, electric meters and transformers, are typically housed within an electrical enclosure such as, for example, a housing, such as a box or cabinet, to protect the electrical equipment.

A load center, for example, is a type of electrical enclosure which serves to distribute power for residential or commercial applications. Typically, a load center includes a housing enclosing a number of electrical switching apparatus (e.g., without limitation, circuit breakers) for protecting branch circuits against electrical faults or overload conditions. The circuit breakers are electrically connected to a bus assembly, which includes at least one line bus and a neutral bus. The line buses may contain terminal lugs to facilitate the attachment and removal of the circuit breakers. Traditionally, the foregoing components have been separately mounted with the housing of the electrical enclosure and then electrically connected to one another. However, such a design fails to make efficient use of the available space within the interior of the housing, thus necessitating an electrical enclosure which is larger than desired.

In an attempt to reduce the overall size of the load center, one prior proposal has been to provide the aforementioned components in the form of a separate sub-assembly. Specifically, the components are first coupled together and then mounted as a unit within the electrical enclosure housing. Although this design has generally resulted in the components being mounted closer together, thus enabling the overall size of the electrical enclosure housing to be reduced, significant room for improvement remains. Specifically, such sub-assemblies are relatively complex in design and require numerous fastening mechanisms, first to secure the various components of the sub-assembly together, and second to mount the sub-assembly within the housing of the electrical enclosure. There is also further room for improvement to make such interior assemblies even smaller, and more economical to manufacture and assemble.

There is a need, therefore, for an interior assembly for electrical enclosures, such as load centers, which is capable of accommodating a plurality of circuit breakers within a minimal amount of space, yet which is relatively easy and cost-effective to manufacture and assemble.

Accordingly, there is room for improvement in electrical enclosures, and in interior assemblies therefor.

SUMMARY OF THE INVENTION

These needs and others are met by embodiments of the invention, which provide an interior assembly for electrical enclosures such as, for example, load centers.

As one aspect of the invention, an interior assembly is provided for an electrical enclosure including a housing and a plurality of electrical switching apparatus enclosed by the housing. The housing has a panel member with at least one aperture, and a plurality of sides extending outwardly from the panel member. The interior assembly comprises: a base member structured to be disposed at or about the panel member of the housing of the electrical enclosure; a first bus bar assembly disposed on the base member and including a first electrical connector; a first insulating member generally overlaying the first bus bar assembly and being coupled to the base member, the first insulating member including a first portion, a second portion and an intermediate portion extending therebetween, the first portion of the first insulating member being structured to receive the electrical switching apparatus of the electrical enclosure; a second bus bar assembly disposed on the second portion of the first insulating member and including a second electrical connector; a second insulating member generally overlaying the second bus bar assembly and being coupled to the second portion of the first insulating member; a neutral bus bar coupled to the second insulating member; and a fastening mechanism structured to fasten the interior assembly to the panel member of the housing.

The base member, the first bus bar assembly, the first insulating member, the second bus bar assembly, the second insulating member, and the neutral bus bar may all be secured with respect to one another without the use of a number of fasteners. The base member may comprise a first edge, a second edge, and an intermediate portion disposed therebetween. The first insulating member may comprise a first end, a second end, a first edge and a second edge, and the second insulating member may comprise a first end, a second end, and an intermediate portion extending therebetween and including a first edge and a second edge. The second edge of the base member may comprise a number of resilient tabs having recesses, and the intermediate portion of the base member may comprise a number of resilient tab protrusions, wherein the first edge of the first insulating member may comprise a number of openings receiving the resilient tab protrusions. The first edge of the intermediate portion of the second insulating member may comprise a substantially vertical wall including a number of first protrusions engaging and securing the neutral bus bar, and the second edge of the intermediate portion of the second insulating member may comprise a lip having a number of second protrusions received by the recesses of the resilient tabs of the second edge of the base member, thereby securing the second insulating member, the neutral bus bar, the second bus bar assembly, the first insulating member and the first bus bar assembly to the base member of the interior assembly.

The first bus bar assembly and the second bus bar assembly may each comprise a generally planar member having a first end, a second end, and a plurality of tangs therebetween, wherein the tangs extend outwardly from the generally planar member. The first electrical connector of the first bus bar assembly may be a first lug electrically connected to the generally planar member of the first bus bar assembly at or about one of the first end of the generally planar member and the second end of the generally planar member, and the second electrical connector of the second bus bar assembly may comprise a second lug electrically connected to the generally planar member of the second bus bar assembly at or about one of the first end of the generally planar member and the second end of the generally planar member. The base member may further comprise a recess disposed at or about the second edge of the base member, wherein the generally planar member of the first electrical bus member is received within the recess of the base member. The intermediate portion of the first insulating member may comprise a plurality of apertures which receive the tangs of the first electrical bus bar assembly. The intermediate portion of the first insulating member may further comprise a substantially vertical wall extending between the first end of the first insulating member and the second end of the first insulating member and including a plurality of slots which receive the tangs of the second electrical bus bar assembly, in order that the tangs of the second electrical bus bar assembly are offset with respect to the tangs of the first electrical bus bar assembly.

The first portion of the first insulating member may further comprise a first end wall, a second end wall, and an intermediate wall disposed therebetween, and the second end of the second insulating member may comprise an end wall disposed proximate the second end wall of the first insulating member, wherein the first lug is disposed between the first end wall of the first insulating member and the intermediate wall of the first insulating member, and the second lug is disposed between the second end wall of the first insulating member and the end wall of the second end of the second insulating member. The neutral bus bar may be disposed between the intermediate wall of the first insulating member and the end wall of the second end of the second insulating member, and the first lug of the first bus bar assembly, the second lug of the second bus bar assembly, and the neutral bus bar may all be disposed at substantially the same elevation with respect to one another.

As another aspect of the invention, an electrical enclosure comprises: a housing including a panel member and a plurality of sides extending outwardly from the panel member, the panel member including at least one aperture; and an interior assembly comprising: a base member disposed at or about the panel member of the housing of the electrical enclosure, a first bus bar assembly disposed on the base member and including a first electrical connector, a first insulating member generally overlaying the first bus bar assembly and being coupled to the base member, the first insulating member including a first portion, a second portion and an intermediate portion extending therebetween, the first portion of the first insulating member receiving the electrical switching apparatus of the electrical enclosure, a second bus bar assembly disposed on the second portion of the first insulating member and including a second electrical connector, the second electrical connector being disposed opposite and distal from the first electrical connector, a second insulating member generally overlaying the second bus bar assembly and being coupled to the second portion of the first insulating member, a neutral bus bar coupled to the second insulating member and being disposed between the first electrical connector of the first bus bar assembly and the second electrical connector of the second bus bar assembly, and a fastening mechanism fastening the interior assembly to the panel member of the housing.

The intermediate portion of the base member may comprise a hole, and the base member may further comprise an interior surface disposed at or about the panel member of the housing of the electrical enclosure, and an exterior surface. The interior surface of the base member may comprise a locating nib, wherein the locating nib engages the aperture of the back panel of the electrical enclosure in order to facilitate positioning the interior assembly in a desired location within the housing of the electrical enclosure. The first portion of the first insulating member may comprise a hole, and the fastening mechanism of the interior assembly may comprise a single fastener, wherein the single fastener is inserted through the hole of the first portion of the first insulating member, through the hole in the intermediate portion of the base member, and is fastened in order to fasten the interior assembly to the panel member of the housing of the electrical enclosure.

The electrical enclosure may be a load center. The load center may include as the electrical switching apparatus, six circuit breakers, and the plurality of receiving stations of the first portion of the first insulating member may comprise six receiving stations receiving the six circuit breakers of the load center.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, embodiments of the invention will be described as applied to compact interior assemblies for load centers although it will become apparent that they could also be applied to interior assemblies of other types of electrical enclosures (e.g., without limitation, meter centers; panel boards; switchgear cabinets) adapted for both indoor and outdoor use.

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" shall mean pins, rivets, nails, threaded fasteners, screws, bolts and the combinations of bolts and nuts (e.g., without limitation, lock nuts) and bolts, washers (e.g., without limitation lock washers) and nuts.

As employed herein, the statement that two or more parts are "coupled" together shall mean that the parts are joined together either directly or joined through one or more intermediate parts.

As employed herein, the term "number" means one or an integer greater than one (i.e., a plurality).

Figure 1:
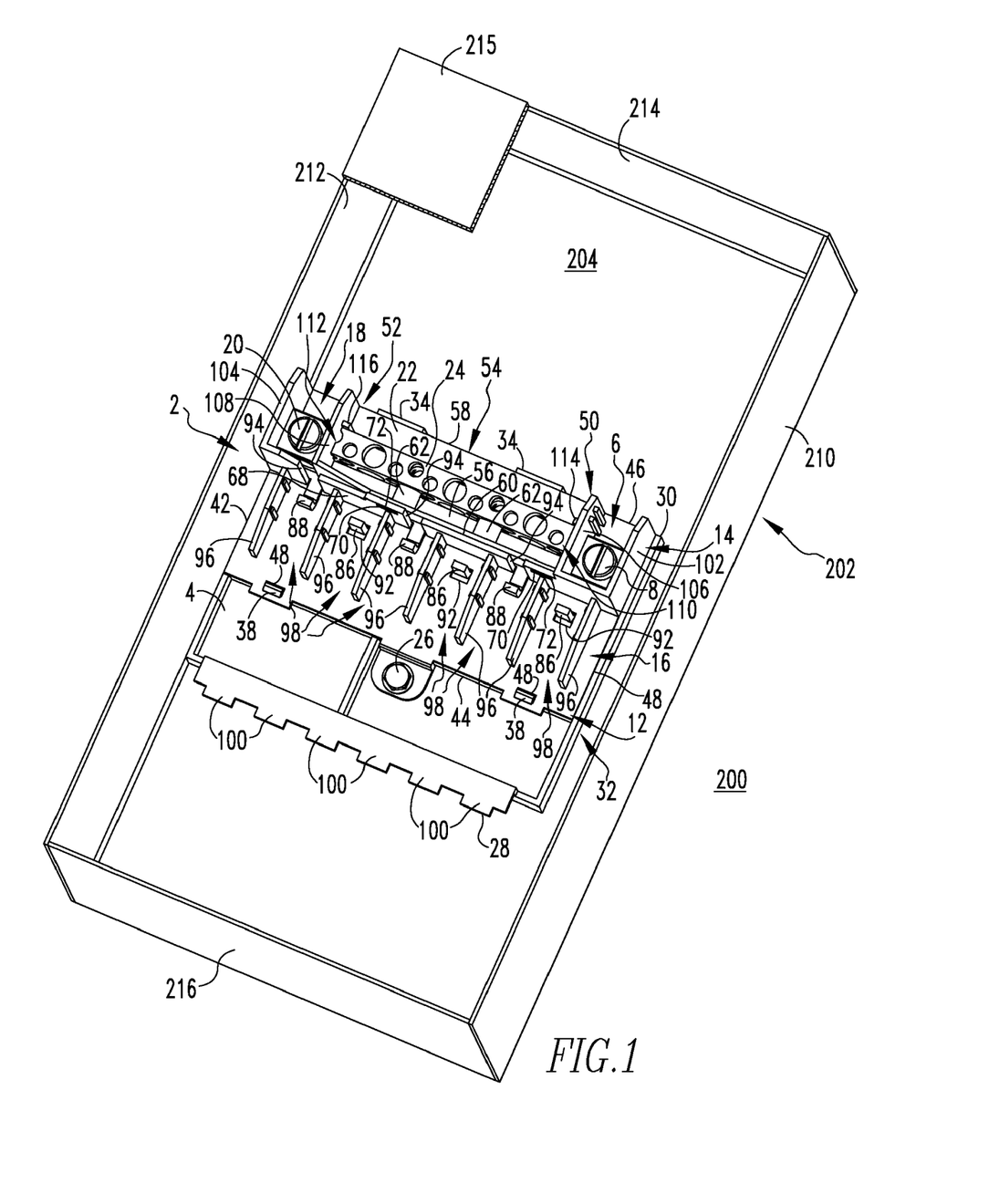
FIG. 1 is an isometric view of a load center and compact interior assembly therefor, in accordance with an embodiment of the invention.

FIG. 1 shows an interior assembly 2 for an electrical enclosure, such as the load center 200, shown. The load center 200 includes a housing 202 structured to enclose a plurality of electrical switching apparatus such as, for example, the circuit breaker 300, shown in FIG. 2. The housing 202 includes a panel member 204 having at least one aperture 206,208 (shown in hidden line drawing in FIG. 5), a plurality of sides 210,212,214,216 extending outwardly from the panel member 206, and a suitable cover 215 (partially shown in FIG. 1).

Figure 3:
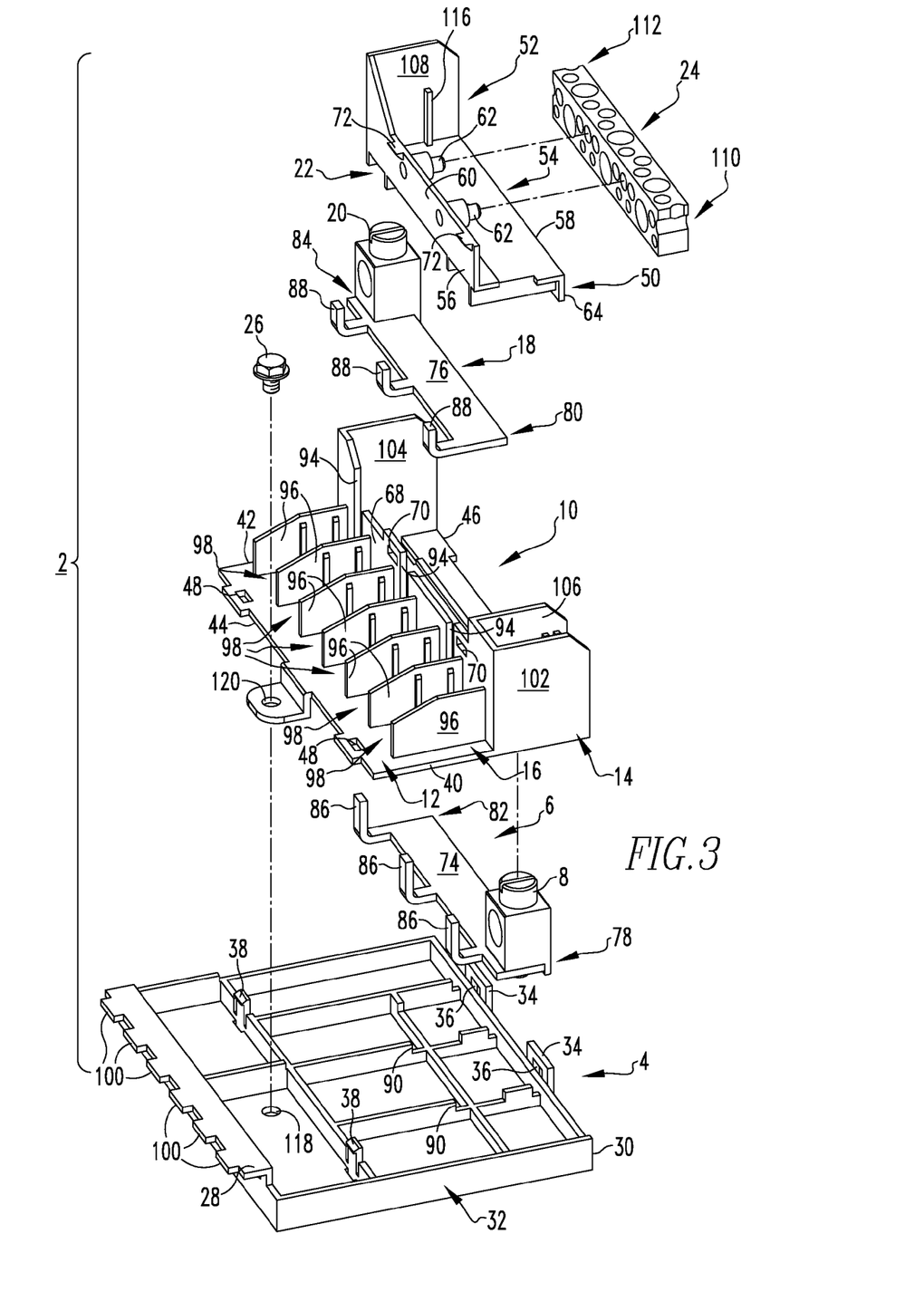
FIG. 3 is an exploded isometric view of the compact interior assembly of FIG. 2, with the circuit breaker not shown.
Figure 4:
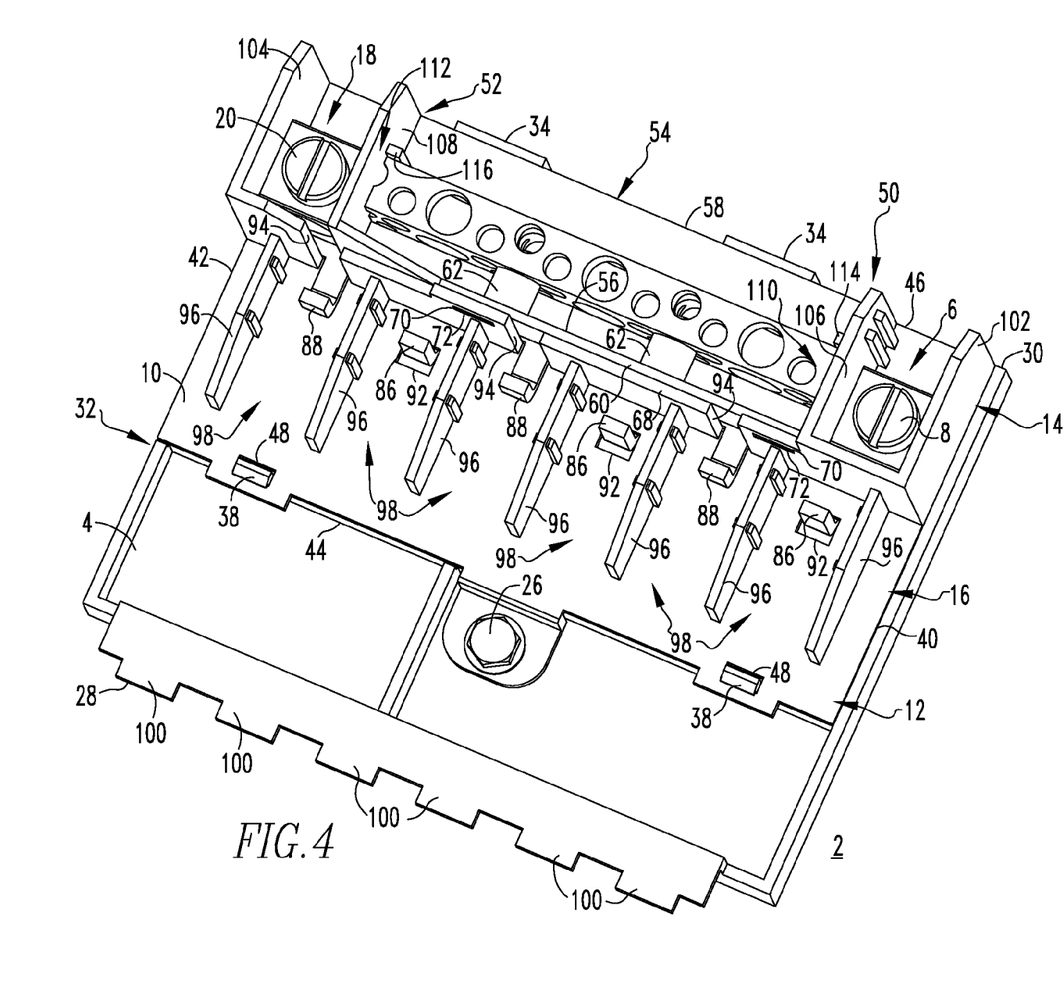
FIG. 4 is an assembled isometric view of the front side of the compact interior assembly of FIG. 3.
Figure 5:
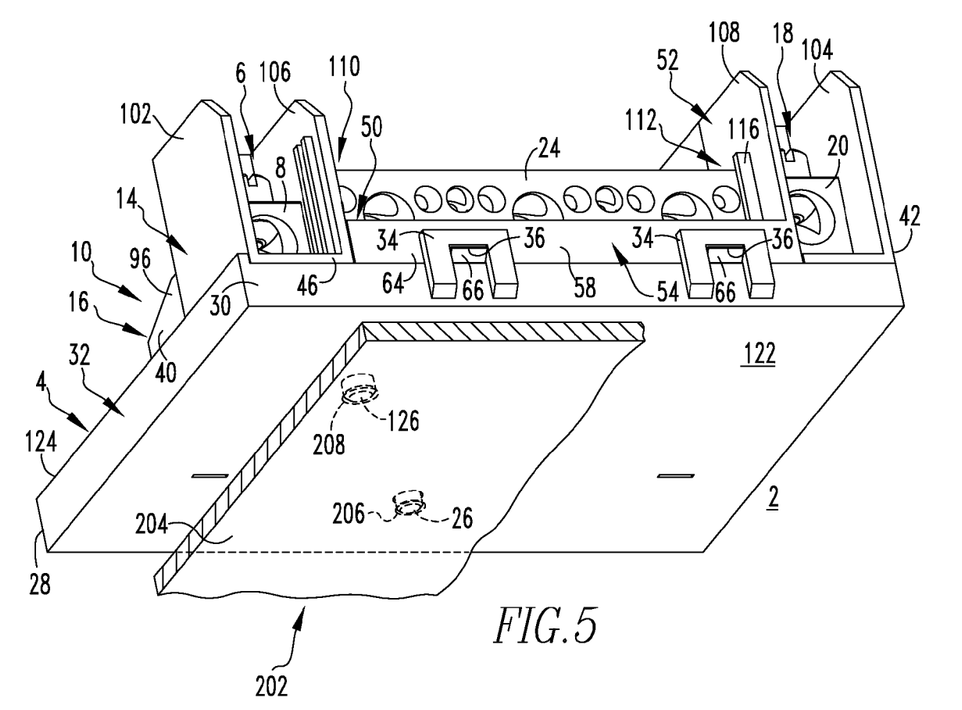
FIG. 5 is an assembled isometric view of the back side of the compact interior assembly of FIG. 4.

As shown in FIGS. 1-5, the interior assembly 2 includes a base member 4 which is structured to be disposed at or about the panel member 204 (FIGS. 1 and 5) of the load center housing 202 (FIGS. 1 and 5), a first bus bar assembly 6 disposed on the base member 4 and including a first electrical connector 8 (e.g., without limitation, a terminal; a lug), and a first insulating member 10 generally overlaying the first bus bar assembly 6. The first insulating member 10 is coupled to the base member 4 and includes a first portion 12, a second portion 14, and an intermediate portion 16 extending therebetween. The first portion 12 of the first insulating member 10 is structured to receive the circuit breakers 300 (see, for example circuit breaker 300 of FIG. 2). A second bus bar assembly 18 of the interior assembly 2 is disposed on the second portion 14 of the first insulating member 10, and includes the second electrical connector 20 (e.g., without limitation, a terminal; a lug). A second insulating member 22 generally overlays the second bus bar assembly 18, and couples to the second portion 14 of the first insulating member 10. A neutral bus bar 24 is coupled to the second insulating member 22, and a fastening mechanism, such as the screw 26 which is shown, fastens the interior assembly 2 to the panel member 204 (FIGS. 1 and 5) of the load center housing 202 (FIGS. 1 and 5). Accordingly, it will be appreciated from FIGS. 1-5 and the corresponding disclosure that the base member 4, the first and second bus bar assemblies 6,18, the first and second insulating members 10,22, and the neutral bus bar 24 of the interior assembly 2 are all secured with respect to one another without the use of a number of separate fasteners. In other words, a unique combination of interlocking and securing features (described hereinbelow) is employed to secure the components of the interior assembly 2 together with only one single fastener 26 being employed not to secure the components of the interior assembly 2 to one another, but rather to mount the already assembled interior assembly 2 in the desired location within the load center housing 202 (FIGS. 1 and 5).

The arrangement and orientation of the components and features of the example interior assembly 2 will be appreciated with reference to the exploded view of FIG. 3. Specifically, the base member 4 of the interior assembly 2 includes a first edge 28, a second edge 30 disposed opposite and distal from the first edge 28, and an intermediate portion 32 disposed therebetween. The first insulating member 10, in addition to the aforementioned first portion 12, second portion 14, and intermediate portion 16, further includes a first end 40, a second end 42, and first and second edges 44,46. The second insulating member 22 includes a first end 50, a second end 52, which is disposed opposite and distal from the first end 50, and an intermediate portion 54 extending therebetween. The intermediate portion 54 of the second insulating member 22 includes a first edge 56 and a second edge 58. Accordingly, the interior assembly 2 which is shown and described herein, generally comprises six components, the base member 4, the first bus bar assembly 6, the first insulating member 10, the second bus bar assembly 18, the second insulating member 22, and the neutral bus bar 24. It will be appreciated that the base member 4, and first and second insulating members 10,22 are made from any known or suitable electrically insulative material such as, for example and without limitation, molded plastic, while the first and second bus bar assemblies 6,18, and the neutral bus bar 24 are made from any known or suitable electrically conductive material such as, for example and without limitation, copper. The manner in which the six components of the example interior assembly 2 are coupled together, without requiring a number of separate fasteners, will now be discussed.

Specifically, the second edge 30 of the base member 4 includes a number of resilient tabs 34 having recesses 36, and the intermediate portion 32 of the base member 4 includes a number of resilient tab protrusions 38. The tab protrusions 38 are received within a number of corresponding openings 48 of the first edge 44 of the first insulating member 10. The neutral bus bar 24 is engaged and secured by a number of first protrusions 62 (two first protrusions 62 are shown in FIG. 3), which extend outwardly from a substantially vertical wall 60 which is disposed at or about the first edge 56 of the intermediate portion 54 of the second insulating member 22. The second edge 58 of intermediate portion 54 of the second insulating member 22 includes a lip 64 having a number of second protrusions 66 (FIG. 5). Such second protrusions 66 are received by the aforementioned recesses 36 of resilient tabs 34 of the second edge 30 of the base member 4. In this manner, the second insulating member 22, neutral bus bar 24, second bus bar assembly 18, first insulating member 10, and first bus bar assembly 6 are secured to the base member 4 of the interior assembly 2.

The intermediate portion 16 of the first insulating member 10 further includes a substantially vertical wall 68, which extends between the first and second ends 40,42 of the first insulating member 10, and includes a number of openings 70. Such openings 70 receive corresponding tabs 72 which extend outwardly from substantially vertical wall 60 of the first edge 56 of second insulating member 22, and toward substantially vertical wall 68 of the first insulating member 10, in order to secure the first and second insulating members 10,22 together and to sandwich, and thus secure, the second bus bar assembly 18 therebetween.

The first and second bus bar assemblies 6,18 each comprise a generally planar member 74,76 having a first end 78,80, a second end 82,84, and a plurality of tangs 86,88, respectively, therebetween. The tangs 86,88 extend outwardly from the respective generally planar members 74,76 and upward to engage and electrically connect a corresponding one of the circuit breakers 300 (see, for example, circuit breaker 300 of FIG. 2) to the interior assembly 2. The first and second electrical connectors 8,20 of the first and second bus bar assemblies 6,18 shown and described herein, are first and second lugs 8,20, respectively. The first lug 8 is electrically connected to the first end 78 of generally planar member 74 of the first bus bar assembly 6, and the second lug 20 is electrically connected to the second end 84 of generally planar member 76 of the second bus bar assembly 18, as best shown in FIG. 3. It will, however, be appreciated that any known or suitable electrical connector (not shown) other than the first and second lugs 8,20 shown and described herein, could be employed in any suitable location with respect to the bus bar assemblies 6,18, without departing from the scope of the invention.

Figure 2:
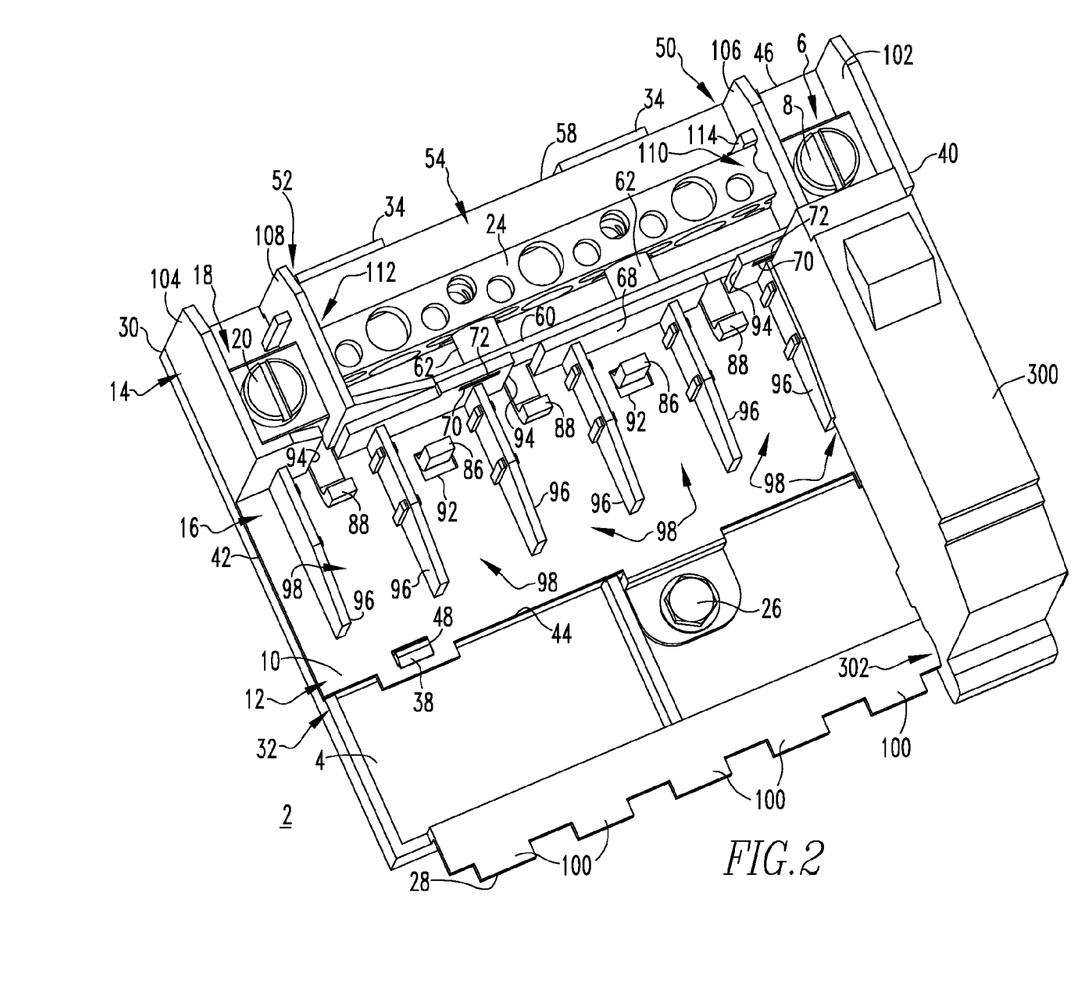
FIG. 2 is an isometric view of the compact interior assembly of FIG. 1, modified to further show a circuit breaker electrically connected to the assembly.

As shown in FIGS. 1, 2 and 4, the intermediate portion 16 of first insulating member 10 includes a plurality of apertures 92 which receive the tangs 86 of the first bus bar assembly 6. In other words, the first bus bar assembly 6 is disposed beneath (from the perspective of FIGS. 1-5) the first insulating member 10, with the tangs 86 of the first bus bar assembly 18 extending upwardly (from the perspective of FIGS. 1-5) through the apertures 92 of intermediate portion 16 of the first insulating member 10. The tangs 88 of the second bus bar assembly 18 are received by slots 94 disposed in the substantially vertical wall 68 of the first insulating member 10. Accordingly, the tangs 88 are generally disposed above (from the perspective of FIGS. 1-4) the first insulating member 10, and are offset with respect to tangs 86 of the first electrical bus bar assembly 6, as best shown in FIGS. 1, 2 and 4.

The first portion 12 of the first insulating member 10 further includes a plurality of insulating walls 96 which extend substantially perpendicularly outwardly from the substantially vertical wall 68 of the first insulating member 10, toward the first edge 44 of the first insulating member 10, in order to define a plurality of receiving stations 98. Each receiving station 98 is structured to receive a corresponding one of the circuit breakers 300 (see, for example, circuit breaker 300 received by one of the receiving stations 98 of FIG. 2) of the load center 200 (FIGS. 1 and 5). One of the tangs 86,88 of the first and second electrical bus bar assemblies 6,18 is disposed within each of the receiving stations 98, and electrically connects to a corresponding one of the circuit breakers 300 (FIG. 2). The first edge 28 of the example base member 4 further includes a plurality of teeth 100 structured to engage a portion 302 of the circuit breaker 300, in order to further secure it to the interior assembly 2, as best shown in FIG. 2.

As shown in FIGS. 1-5, the first portion 12 of first insulating member 10 further includes a first end wall 102, a second end wall 104, and an intermediate wall 106 disposed therebetween. The first end wall 102 is disposed at or about the first end 40 of the first insulating member 2, and the second end wall 104 is disposed at or about the second end 42. The intermediate wall 106 is disposed proximate the first end wall 102 and distal from the second end wall 104. The second end 52 of the second insulating member 22 also includes an end wall 108, which is disposed proximate the second end wall 104 of the first insulating member 10. In this manner, a pair of electrically insulative chambers is provided at opposite ends of the interior assembly 2 wherein the first lug 8 is disposed between the first end wall 102 and the intermediate wall 106 of the first insulating member 10, and the second lug 20 is disposed between second end wall 104 of the first insulating member 10 and end wall 108 of the second end 52 of the second insulating member 22. In this manner, the lugs 8,20 are electrically insulated from one another as well as from the neutral bus bar 24 and three of the circuit breakers 300 (FIG. 2). Specifically, the neutral bus bar 24 is disposed between the intermediate wall 106 of the first insulating member 10 and the end wall 108 of the second end 52 of second insulating member 22. Additionally, in the example shown and described herein, the intermediate wall 106 of the first insulating member 10 includes a first retaining tab 114 (FIGS. 1, 2 and 4) which retains the first end 110 of the neutral bus bar 24, and the end wall 108 of the second end 52 of second insulating member 22 includes a second retaining tab 116 (FIGS. 1, 3, 4 and 5), which retains the second end 112 of the neutral bus bar 24. The example first lug 8 of the first bus bar assembly 6, second lug 20 of the second bus bar assembly 18, and neutral bus bar 24 are all disposed at substantially the same elevation with respect to one another, and all face upward (from the perspective of FIG. 1). This configuration makes wiring of the interior assembly 2 relatively simple, for example, for an electrician, because the lugs 8, 20 and neutral bus bar 24 all face the direction from which the wires (not shown) enter the load center housing 202. Accordingly, the wires (not shown) can all be made to have the same length, extending substantially straight down (from the perspective of FIG. 1) from the top (from the perspective of FIG. 1) side 214 of the housing 202 where the wires (not shown) enter, to the interior assembly 2, as opposed to the wires (not shown) being unnecessary long with different lengths and being bent throughout the interior of the load center housing 202. It will, however, be appreciated that the electrical bus bar assemblies 6,18 and neutral bus bar 24 could be disposed in any suitable alternative configuration, without departing from the scope of the invention.

As best shown in FIG. 3, the intermediate portion 32 of base member 4 of the interior assembly 2 includes a hole 118 which is structured to align with a corresponding hole 120 in the first portion 12 of first insulating member 10 of the interior assembly 2. The fastening mechanism, which in the example shown and described herein comprises a single threaded screw 26 (shown in hidden line drawing in FIG. 5), is inserted through hole 120 of the first portion 12 of first insulating member 10, through hole 118 in the intermediate portion 32 of base member 4, and into a corresponding threaded aperture 206 (shown in hidden line drawing in FIG. 5) of the panel member 204 (FIGS. 1 and 5) of the load center housing 202 (FIGS. 1 and 5). Accordingly, it will be appreciated that a single fastener 26 is employed to secure the entire interior assembly 2 to the panel member 204. It will be appreciated that any known or suitable fastener, as defined herein, other than the threaded screw 26 shown, could be employed to perform this function. For example and without limitation, a combination of a threaded fastener inserted through a thru hole (not shown) in the panel member 204 (FIGS. 1 and 5) and receiving a corresponding threaded nut (not shown) could be employed. In order to facilitate positioning the interior assembly 2 in the desired location within the housing 202 (FIGS. 1 and 5), the base member 4 of the example interior assembly 2 includes a locating nib 126, which protrudes from the interior surface 122 of the base member 4, and engages a corresponding aperture 208 of the panel member 204 of the load center housing 202, as shown in hidden line drawing in FIG. 5. It will, however, be appreciated that any known or suitable number and configuration of positioning mechanisms (not shown) other than locating nib 126, could be employed in order to facilitate positioning the interior assembly 2 in the desired location within the housing 202, and maintaining such position. The locating nib 126, in large part, serves to permit the aforementioned use of only one single fastener 26 to secure the interior assembly 2 to the panel member 204 (FIGS. 1 and 5). For example and without limitation, the locating nib 126, which is offset with respect to the fastener 26, as shown in FIG. 5, prevents the interior assembly 2 from undesirably moving (e.g., without limitation, rotating) within the load center housing 202.

Accordingly, it will be appreciated that embodiments of the invention provide an interior assembly 2 which is comprised of a minimal number of relatively simple components, such components being secured together by a unique combination of interlocking and securing features (e.g., without limitation, tabs; protrusions; recesses; slots; teeth; tangs; openings) without requiring a number of separate fasteners. Thus, the components are effectively secured together in a compact configuration, thereby providing the ability to further reduce the overall size of the housing 202 which is required for the electrical enclosure (e.g., load center 200). The use of one single fastener 26 to secure the example interior assembly 2 to the housing 202 also makes the disclosed interior assembly 2 relatively easy and cost-effective to manufacture and assemble.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An interior assembly for an electrical enclosure including a housing and a plurality of electrical switching apparatus enclosed by said housing, said housing having a panel member with at least one aperture and a plurality of sides extending outwardly from said panel member, said interior assembly comprising:
   a base member structured to be disposed at or about said panel member of said housing of said electrical enclosure;
   a first bus bar assembly disposed on said base member and including a first electrical connector;
   a first insulating member generally overlaying said first bus bar assembly and being coupled to said base member, said first insulating member including a first portion, a second portion and an intermediate portion extending therebetween, said first portion of said first insulating member being structured to receive said electrical switching apparatus of said electrical enclosure;
   a second bus bar assembly disposed on said second portion of said first insulating member and including a second electrical connector;
   a second insulating member generally overlaying said second bus bar assembly and being coupled to said second portion of said first insulating member;
   a neutral bus bar coupled to said second insulating member; and
   a fastening mechanism structured to fasten said interior assembly to said panel member of said housing.

2. The interior assembly of claim 1 wherein said base member, said first bus bar assembly, said first insulating member, said second bus bar assembly, said second insulating member and said neutral bus bar are all secured with respect to one another without the use of a number of fasteners.

3. The interior assembly of claim 1 wherein said base member comprises a first edge, a second edge disposed opposite and distal from said first edge, and an intermediate portion disposed between said first edge of said base member and said second edge of said base member; wherein said first insulating member comprises a first end, a second end, a first edge and a second edge; and wherein said second insulating member comprises a first end, a second end disposed opposite and distal from the first end, and an intermediate portion extending therebetween and including a first edge and a second edge.

4. The interior assembly of claim 3 wherein said second edge of said base member comprises a number of resilient tabs having recesses; wherein said intermediate portion of said base member comprises a number of resilient tab protrusions; wherein said first edge of said first insulating member comprises a number of openings receiving said resilient tab protrusions of said intermediate portion of said base member; wherein said first edge of said intermediate portion of said second insulating member comprises a substantially vertical wall including a number of first protrusions engaging and securing said neutral bus bar; and wherein said second edge of said intermediate portion of said second insulating member comprises a lip having a number of second protrusions received by said recesses of said resilient tabs of said second edge of said base member, thereby securing said second insulating member, said neutral bus bar, said second bus bar assembly, said first insulating member and said first bus bar assembly to said base member of said interior assembly.

5. The interior assembly of claim 4 wherein said intermediate portion of said first insulating member further comprises a substantially vertical wall extending between the first end of said first insulating member and the second end of said first insulating member, said substantially vertical wall including a number of openings; wherein said substantially vertical wall of said first edge of said second insulating member further comprises a number of tabs extending outwardly toward said substantially vertical wall of said intermediate portion of said first insulating member; and wherein said openings of said substantially vertical wall of said intermediate portion of said first insulating member receive said tabs of said substantially vertical wall of said first edge of said second insulating member.

6. The interior assembly of claim 3 wherein said first bus bar assembly and said second bus bar assembly each comprise a generally planar member having a first end, a second end, and a plurality of tangs therebetween; wherein said tangs extend outwardly from said generally planar member; wherein said first electrical connector of said first bus bar assembly is a first lug electrically connected to said generally planar member of said first bus bar assembly at or about one of the first end of said generally planar member and the second end of said generally planar member; and wherein said second electrical connector of said second bus bar assembly comprises a second lug electrically connected to said generally planar member of said second bus bar assembly at or about one of the first end of said generally planar member and the second end of said generally planar member.

7. The interior assembly of claim 6 wherein said base member further comprises a recess disposed at or about said second edge of said base member; wherein said generally planar member of said first electrical bus member is received within said recess of said base member; wherein said intermediate portion of said first insulating member comprises a plurality of apertures; and wherein said apertures of said intermediate portion of said first insulating member receive said tangs of said first electrical bus bar assembly.

8. The interior assembly of claim 7 wherein said intermediate portion of said first insulating member further comprises a substantially vertical wall extending between the first end of said of said first insulating member and the second end of said first insulating member; wherein said substantially vertical wall of said intermediate portion of said first insulating member includes a plurality of slots; wherein said slots of said substantially vertical wall of said intermediate portion of said first insulating member receive said tangs of said second electrical bus bar assembly; and wherein said tangs of said second electrical bus bar assembly are offset with respect to said tangs of said first electrical bus bar assembly.

9. The interior assembly of claim 8 wherein said first portion of said first insulating member further comprises a plurality of insulating walls extending substantially perpendicularly outwardly from said substantially vertical wall of said intermediate portion of said first insulating member and toward said first edge of said first insulating member; wherein said insulating walls define a plurality of receiving stations structured to receive said electrical switching apparatus of said electrical enclosure; and wherein each tang of said tangs of said first electrical bus bar assembly and said tangs of said second electrical bus bar assembly is disposed within a corresponding one of said receiving stations, and is structured to be electrically connected to a corresponding one of said electrical switching apparatus of said electrical enclosure.

10. The interior assembly of claim 9 wherein said first edge of said base member further comprises a plurality of teeth structured to engage and secure a portion of said electrical switching apparatus of said electrical enclosure.

11. The interior assembly of claim 3 wherein said first electrical connector of said first bus bar assembly is a first lug; wherein said second electrical connector of said second bus bar assembly is a second lug; wherein the said first portion of said first insulating member further comprises a first end wall, a second end wall, and an intermediate wall disposed therebetween; wherein said first end wall of said first insulating member is disposed at or about the first end of said first insulating member, and the second end wall of said first insulating member is disposed at or about the second end of said first insulating member; wherein said intermediate wall of said first insulating member is disposed proximate said first end wall of said first insulating member and distal from said second end wall of said first insulating member; wherein the second end of said second insulating member comprises an end wall disposed proximate said second end wall of said first insulating member; and wherein said first lug is disposed between said first end wall of said first insulating member and said intermediate wall of said first insulating member, and said second lug is disposed between said second end wall of said first insulating member and said end wall of the second end of said second insulating member.

12. The interior assembly of claim 11 wherein said neutral bus bar is disposed between said intermediate wall of said first insulating member and said end wall of the second end of said second insulating member; wherein said neutral bus bar has a first end and a second end; wherein said intermediate wall of said first insulating member includes a first retaining tab retaining the first end of said neutral bus bar; and wherein said end wall of the second end of said second insulating member includes a second retaining tab retaining the second end of said neutral bus bar.

13. The interior assembly of claim 12 wherein said first lug of said first bus bar assembly, said second lug of said second bus bar assembly, and said neutral bus bar are all disposed at substantially the same elevation with respect to one another.

14. The interior assembly of claim 3 wherein said intermediate portion of said base member comprises a hole; wherein said first portion of said first insulating member comprises a hole; wherein said fastening mechanism of said interior assembly comprises a single fastener; and wherein said single fastener is inserted through said hole of said first portion of said first insulating member, through said hole in said intermediate portion of said base member, and is structured to fasten said interior assembly to said panel member of said housing of said electrical enclosure.

15. The interior assembly of claim 14 wherein said base member further comprises an interior surface structured to be disposed at or about said panel member of said housing of said electrical enclosure, and an exterior surface; wherein said interior surface of said base member comprises a locating nib; and wherein said locating nib is structured to engage said at least one aperture of said back panel of said electrical enclosure in order to facilitate positioning said interior assembly in a desired location within said housing of said electrical enclosure.

16. An electrical enclosure comprising:
a housing including a panel member and a plurality of sides extending outwardly from said panel member, said panel member including at least one aperture; and
an interior assembly comprising:
a base member disposed at or about said panel member of said housing of said electrical enclosure,
a first bus bar assembly disposed on said base member and including a first electrical connector,
a first insulating member generally overlaying said first bus bar assembly and being coupled to said base member, said first insulating member including a first portion, a second portion and an intermediate portion extending therebetween, said first portion of said first insulating member receiving an electrical switching apparatus of said electrical enclosure,
a second bus bar assembly disposed on said second portion of said first insulating member and including a second electrical connector, said second electrical connector being disposed opposite and distal from said first electrical connector,
a second insulating member generally overlaying said second bus bar assembly and being coupled to said second portion of said first insulating member,
a neutral bus bar coupled to said second insulating member and being disposed between said first electrical connector of said first bus bar assembly and said second electrical connector of said second bus bar assembly, and
a fastening mechanism fastening said interior assembly to said panel member of said housing.

17. The electrical enclosure of claim 16 wherein said base member, said first bus bar assembly, said first insulating member, said second bus bar assembly, said second insulating member and said neutral bus bar are all secured with respect to one another without the use of a number of fasteners.

18. The electrical enclosure of claim 16 wherein said base member comprises a first edge, a second edge disposed opposite and distal from said first edge, and an intermediate portion disposed between said first edge of said base member and said second edge of said base member; wherein said first insulating member comprises a first end, a second end, a first edge and a second edge; and wherein said second insulating member comprises a first end, a second end disposed opposite and distal from the first end, and an intermediate portion extending therebetween and including a first edge and a second edge.

19. The electrical enclosure of claim 18 wherein said second edge of said base member comprises a number of resilient tabs having recesses; wherein said intermediate portion of said base member comprises a number of resilient tab protrusions; wherein said first edge of said first insulating member comprises a number of openings receiving said resilient tab protrusions of said intermediate portion of said base member; wherein said first edge of said intermediate portion of said second insulating member comprises a substantially vertical wall including a number of first protrusions engaging and securing said neutral bus bar; and wherein said second edge of said intermediate portion of said second insulating member comprises a lip having a number of second protrusions received by said recesses of said resilient tabs of said second edge of said base member, thereby securing said second insulating member, said neutral bus bar, said second bus bar assembly, said first insulating member and said first bus bar assembly to said base member of said interior assembly.

20. The electrical enclosure of claim 19 wherein said intermediate portion of said first insulating member further comprises a substantially vertical wall extending between the first end of said first insulating member and the second end of said first insulating member, and including a number of openings; wherein said substantially vertical wall of said first edge of said second insulating member further comprises a number of tabs extending outwardly toward said substantially vertical wall of said intermediate portion of said first insulating member; and wherein said openings of said substantially vertical wall of said intermediate portion of said first insulating member receive said tabs of said substantially vertical wall of said first edge of said second insulating member.

21. The electrical enclosure of claim 18 wherein said first bus bar assembly and said second bus bar assembly each comprise a generally planar member having a first end, a second end, and a plurality of tangs therebetween; wherein said tangs extend outwardly from said generally planar member; wherein said first electrical connector of said first bus bar assembly is a first lug electrically connected to said generally planar member of said first bus bar assembly at or about one of the first end of said generally planar member and the second end of said generally planar member; and wherein said second electrical connector of said second bus bar assembly comprises a second lug electrically connected to said generally planar member of said second bus bar assembly at or about one of the first end of said generally planar member and the second end of said generally planar member; wherein said base member further comprises a recess disposed at or about said second edge of said base member; wherein said generally planar member of said first electrical bus member is received within said recess of said base member; wherein said intermediate portion of said first insulating member comprises a plurality of apertures and a substantially vertical wall extending between the first end of said first insulating member and the second end of said first insulating member; wherein said apertures of said intermediate portion of said first insulating member receive said tangs of said first electrical bus bar assembly; wherein said substantially vertical wall of said intermediate portion of said first insulating member includes a plurality of slots; wherein said slots of said substantially vertical wall of said intermediate portion of said first insulating member receive said tangs of said second electrical bus bar assembly; and wherein said tangs of said second electrical bus bar assembly are offset with respect to said tangs of said first electrical bus bar assembly.

22. The electrical enclosure of claim 21 wherein said first portion of said first insulating member further comprises a plurality of insulating walls extending substantially perpendicularly outwardly from said substantially vertical wall of said intermediate portion of said first insulating member and toward said first edge of said first insulating member; wherein said insulating walls define a plurality of receiving stations receiving said electrical switching apparatus of said electrical enclosure; wherein each tang of said tangs of said first electrical bus bar assembly and said tangs of said second electrical bus bar assembly is disposed within a corresponding one of said receiving stations, and is electrically connected to a corresponding one of said electrical switching apparatus of said electrical enclosure; and wherein said first edge of said base member further comprises a plurality of teeth engaging and securing a portion of said electrical switching apparatus of said electrical enclosure.

23. The electrical enclosure of claim 22 wherein said electrical enclosure is a load center; wherein said load center includes as said electrical switching apparatus, six circuit breakers; and wherein said plurality of receiving stations of said first portion of said first insulating member is six receiving stations receiving said six circuit breakers of said load center.

24. The electrical enclosure of claim 18 wherein said first electrical connector of said first bus bar assembly is a first lug; wherein said second electrical connector of said second bus bar assembly is a second lug; wherein the said first portion of said first insulating member further comprises a first end wall, a second end wall, and an intermediate wall disposed therebetween; wherein said first end wall of said first insulating member is disposed at or about the first end of said first insulating member, and the second end wall of said first insulating member is disposed at or about the second end of said first insulating member; wherein said intermediate wall of said first insulating member is disposed proximate said first end wall of said first insulating member and distal from said second end wall of said first insulating member; wherein the second end of said second insulating member comprises an end wall disposed proximate said second end wall of said first insulating member; and wherein said first lug is disposed between said first end wall of said first insulating member and said intermediate wall of said first insulating member, and said second lug is disposed between said second end wall of said first insulating member and said end wall of the second end of said second insulating member.

25. The electrical enclosure of claim 24 wherein said neutral bus bar is disposed between said intermediate wall of said first insulating member and said end wall of the second end of said second insulating member; wherein said neutral bus bar has a first end and a second end; wherein said intermediate wall of said first insulating member includes a first retaining tab retaining the first end of said neutral bus bar; and wherein said end wall of the second end of said second insulating member includes a second retaining tab retaining the second end of said neutral bus bar.

26. The electrical enclosure of claim 18 wherein said intermediate portion of said base member comprises a hole; wherein said base member further comprises an interior surface disposed at or about said panel member of said housing of said electrical enclosure, and an exterior surface; wherein said interior surface of said base member comprises a locating nib; wherein said locating nib engages said at least one aperture of said back panel of said electrical enclosure in order to facilitate positioning said interior assembly in a desired location within said housing of said electrical enclosure; wherein said first portion of said first insulating member comprises a hole; wherein said fastening mechanism of said interior assembly comprises a single fastener; and wherein said single fastener is inserted through said hole of said first portion of said first insulating member, through said hole in said intermediate portion of said base member, and is fastened in order to fasten said interior assembly to said panel member of said housing of said electrical enclosure.

* * * * *